Aug. 4, 1959  K. GEBELE  2,897,737
PHOTOGRAPHIC SHUTTER CONSTRUCTION
Filed May 9, 1956 though in some constructions the interval may be as low as about 6 seconds or as high as about 40 seconds. The delayed action mechanism may be of any suitable known construction, including a train of gears driven from a spring and having its speed of operation controlled by an escapement, so that a suitable interval of time must elapse between releasing the delayed action mechanism and the completion of its operation, so that the final act of the delayed action mechanism, in releasing the shutter blades to open, is delayed for the indicated interval after the initial release of the delayed action mechanism itself.

United States Patent Office 2,897,737
Patented Aug. 4, 1959

2,897,737

PHOTOGRAPHIC SHUTTER CONSTRUCTION

Kurt Gebele, Munich, Germany, assignor to Hans Deckel, Munich, Germany, and Friedrich Wilhelm Deckel, Zug, Switzerland Application May 9, 1956, Serial No. 583,702

Claims priority, application Germany May 11, 1955

7 Claims. (Cl. 95—11.5)

This invention relates to a photographic shutter of the kind which includes photoflash synchronizer mechanism and also mechanism for delaying the initiation of the exposure, so as to allow the user to trip the shutter and then take a position in front of the camera to get in the picture.

Sutters of this general type are already well known. However, there are important drawbacks or disadvantages to the previously known constructions, especially in that the setting member which sets the shutter for the delayed beginning of the exposure or for different kinds of synchronizer operations, is likely to be accidentally engaged and moved by the operator when making other adjustments of the shutter mechanism or associated parts; for example, adjusting the shutter speed, or the diaphragm aperture, or focusing the lens.

An object of the invention is the provision of a generally improved and more satisfactory shutter of the general type above mentioned.

Another object is the provision of a shutter construction so designed as to provide adequate safeguards against accidental displacement of the control member or adjusting member which is used for setting the synchronizer or the delayed beginning of the exposure.

A further object is the provision of an adjusting member for adjusting the synchronizer or the exposure delay mechanism or both, movable in one direction for adjustment purposes, in combination with a latch or lock movable in a different direction to release the adjustment member, so that it is practically impossible to release and move the adjustment member accidentally because of the required separate motions in two directions.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
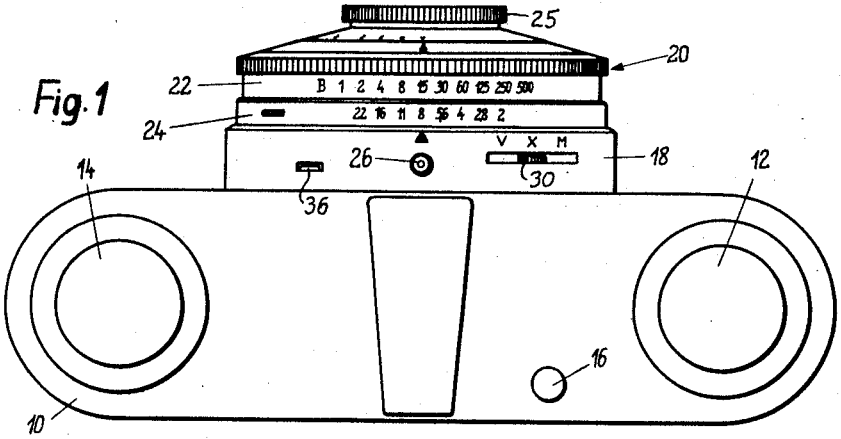
Fig. 1 is a top plan view of a camera equipped with a shutter in accordance with a preferred embodiment of the present invention.

In Fig. 1 there is shown a camera body 10 of any conventional type, having a film winding knob or button 12 for advancing the film, a film rewinding knob 14 for rewinding the film back into the cassette or holder after the series of exposures have been completed, and a release plunger or trigger member 16, which, when depressed, initiates the operation of the shutter previously tensioned or cocked by operation of the film winding knob 12. The front of the camera is equipped with an adapter housing 18, which carries the shutter assembly of an objective shutter, indicated in general at 20. Except as otherwise described below, the construction of the shutter assembly as well as the construction of the shutter assembly as well as the construction of the mechanism for cocking or tensioning the shutter from operation of the film winding knob 12, and the construction of the mechanism for releasing the shutter for movement of the body release or trigger member 16, may be of any suitable form already well known. Examples of possible constructions are disclosed in copending United States patent applications, Serial No. 514,218, filed June 9, 1955, and Serial No. 520,875, filed July 8, 1955. But other known constructions may also be used.

Within the shutter housing or casing there are, as usual in modern objective shutters, suitable shutter blades and suitable operating mechanism for moving the blades to open and close them at variable speeds depending upon the desired length of exposure, the speed of operation of the shutter blades and consequently the duration of exposure being adjustable as usual by turning the shutter speed adjusting ring 22 in a circumferential direction on the shutter casing, about the optical axis of the shutter as a center of rotation. The shutter also contains, as usual, iris diaphragm leaves or blades, adjustable to vary the size of the diaphragm aperture by turning the diaphragm adjusting ring 24 likewise in a circumferential direction on the casing around the optical axis as a center of rotation. The aperture adjusting ring 24 and the speed adjusting ring 22 may or may not be coupled to each other to turn together as a unit, it being wholly immaterial for purposes of the present invention whether these two adjusting members are coupled to each other or whether they always operate entirely independently. The shutter may also include a lens, and at its front, a focus adjusting ring 25, likewise turning about the optical axis as a center and serving, in the usual known manner, to cause axial movement of one or more components of the lens, for purposes of focusing.

The shutter structure also includes a photoflash synchronizer of known construction, including an electric switch connected by a suitable electric circuit to a photoflash lamp or bulb so as to fire the lamp or bulb in predetermined timed relationship to the opening of the shutter blades when making an exposure. The circuit from the switch to the flashlamp may include the usual connection nipple 26 mounted on the shutter housing or casing, for detachable connection with the usual flexible cable leading to the flashlamp apparatus. As customary in modern shutters, the synchronizer mechanism is adjustable to vary the time of closing the electric switch relative to the operation of the shutter blades, at least to two different adjustments respectively representing so-called M and X synchronization, the M position being one in which the electric circuit switch is closed at a suitable time interval (usually about 20 milliseconds) in advance of full opening of the shutter blades to allow for the time lag between the closing of the electric circuit and the time that certain types of photoflash bulbs reach maximum illumination brilliance, while the synchronizer mechanism when adjusted for X position serves to close the electric circuit simultaneously with the reaching of fully open position by the shutter blades, to enable the use of flashlamps of the type which have substantially no appreciable time lag between the closing of the electric circuit and the production of maximum brilliance of illumination.

Also, the shutter housing includes the customary delayed action mechanism for delaying the beginning of the true shutter operation, usually by an interval of about 15 to 30 seconds, so as to allow time for the photographer, after tripping the shutter, to place himself in front of the camera so that he may be included in the picture. Frequently, but not always, the same gear train which is used for delaying the beginning of the exposure is used also, at least in part, for delaying the opening of the shutter blades after the electric synchronizer switch is closed, when the mechanism is set for M synchronization. Usually, also, a single control member or adjusting member is employed for adjusting the mechanism alternatively either for M synchronization, for X synchronization, or for operation of the delayed action or delayed beginning mechanism.

Figure 2:
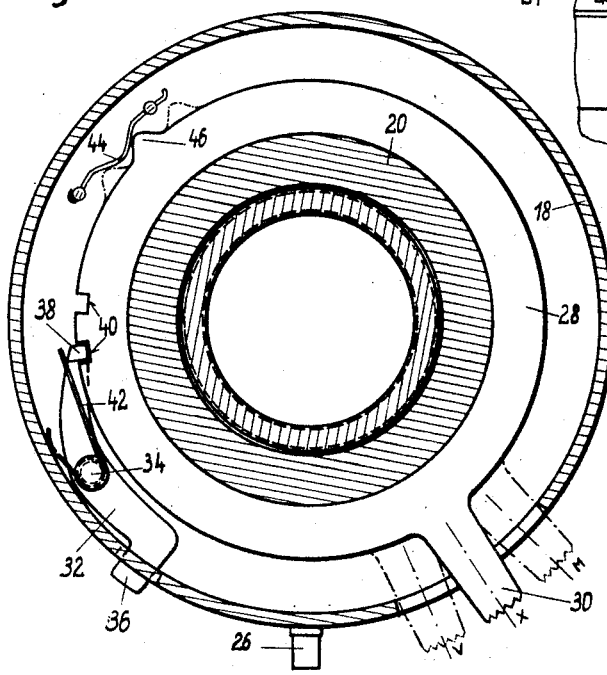
Fig. 2 is a transverse section through the shutter, showing certain details of construction according to the present invention.
Figure 3:
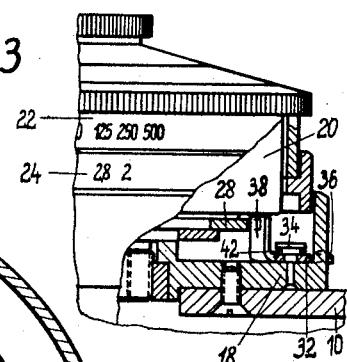
Fig. 3 is a fragmentary radial section through the shutter.
Figure 4:
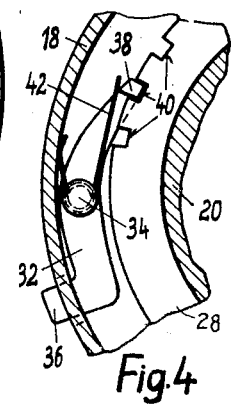
Fig. 4 is a view similar to a fragment of Fig. 2, showing a modified construction.

Such adjusting member is shown at 28 in Figs. 2–4 and comprises a ring turning on a fixed part 20 of the shutter and having a radial arm 30 extending out through a circumferential slot in the shutter housing, to an accessible external position, so that the outer end of the arm 30 may be manually moved circumferentially to adjust this member to either one of the two synchronizing positions indicated respectively at M and X in Figs. 1 and 2, or to the delayed action or delayed beginning position indicated at V.

The mechanism thus far described is conventional, and the details of construction are not important for purposes of the present invention. The way in which the rotary movements of the ring 28 serve to control the synchronizer mechanism for M or X exposures, and serve to make the delayed action or delayed beginning mechanism effective or operative, are well known. Any suitable known construction may be used, examples being the construction shown in the copending U.S. patent applications, Serial No. 395,557, filed December 1, 1953 (now Patent 2,831,411), and Serial No. 492,541, filed March 7, 1955. Other examples are the well known "Compur" shutters, type MXV-CROO, as used on "Retina" cameras made in Germany and exported to the United States since 1954, especially "Retina" Model III c.

At one point on its periphery, the ring 28 is provided with a projection 46 which engages a retaining spring or detent spring 44 as shown in Fig. 2, to tend to hold the ring 28 resiliently in either one of the two synchronizing positions M and X, enabling the operator to feel when it is properly located in one or the other of these two positions. However, slight circumferential pressure is sufficient to overcome the holding force of the spring 44 and to allow the ring 28 to turn.

It will be noted that the ring 28 turns in the same direction as the shutter speed adjusting ring 22, the diaphragm aperture adjusting ring 24, and the focus adjusting member 25; that is, it turns circumferentially relative to the shutter housing, about the optical axis of the lens 23 as a center. Therefore, unless special precautions are taken, there is considerable danger that the photographer may accidentally engage and move the adjusting members 28, 30, when he is adjusting one or another of the rings or members 22, 24, or 25. This is especially true if the photograher happens to place his hand across the front of the shutter housing with his fingers extending axially rearwardly toward the camera body, in embracing and grasping relation to the member which he wishes to adjust. It is easily possible that one or another of his fingers may extend far enough back to engage with the arm 30 of the ring 28, and cause circumferential movement of such arm, which might not be noticed by the photographer. Although the arm 30 is behind the rings 22 and 24, as seen in Fig. 1, it is usually fairly close to these rings, in order to keep the shutter of compact size.

The possibility of such accidental movement of the adjusting member 28 is prevented or greatly minimized, according to the present invention, by employing a latch or lock which, in order to be released, requires movement in a direction different from the direction of movement of the member 28. For this purpose, there is located within the housing adapter portion 18 a two-armed detent or latch 32, fulcrumed on a pivot pin 34, and having one arm 36 which projects radially outwardly through a slot in the housing, in a position preferably located at a substantial angular distance away from the arm 30 of the member 28. The other arm 38 of the detent or latch lever has an inwardly extending projection or nose adapted to engage in either one of two notches 40 formed in the ring 28, which notches respectively come opposite the nose 38 when the ring 28 is turned to either its M or X synchronization position, respectively. A spring 42 tends to keep the nose 38 engaged with the ring 28, or with a notch 40 thereof.

It will be noted that the notches 40 have square ends, and the nose 38 likewise has square ends, so that when the nose is engaged with either one of the notches 40, it can be disengaged therefrom only by a definite inward motion of the end 36 of the latching lever, to move the nose 38 outwardly against the force of the spring 42. Circumferential pressure applied to the ring 28 cannot by itself cause the latch to disengage.

Therefore, this construction is quite safe in operation, since two distinctly different motions are necessary to move the adjusting member 28 away from either its X position or its M position. First, a radially inward motion is necessary against the exposed end 36 of the latching lever, and then a circumferential motion of the operating arm 30 is necessary. Moreover, not only are these two motions in distinctly different directions, but also the motions must be carried out in locations which are spaced substantially from each other in a circumferential direction, but not diametrically opposite each other. Preferably the members are spaced from 60° to 120° from each other. The substantial circumferential spacing of the member 36 from the member 30 insures that both members cannot be simultaneously actuated accidentally by a single finger. Also the fact that the member 36 is not placed diametrically opposite to the member 30 insures that both members cannot be actuated simultaneously accidentally by the operator's thumb and finger which might be placed at diametrically opposite points on the shutter housing to embrace one or another of the adjusting rings for the purpose of turning the adjusting ring. When it is desired purposely to operate the adjusting member 28 from X position to M position or vice versa, or to move it from either of these two positions to the V position, it will be necessary purposely to depress the end 36 of the latching lever, and to hold it depressed while the arm 30 is moved.

In the particular construction shown in Fig. 2, the ring 28 is not latched in the V position, but only in the X and M positions. This type of construction is intended for shutter assemblies in which the delayed action shutter release is equipped with its own driving spring which is cocked or tensioned by means of a special cocking motion actuated when the ring 28 is moved into the V position, such a construction in itself (but without the latching or locking feature of the present invention) being already known. In such a construction, when the spring is cocked and the arm 30 is released by the operator, the ring 30 returns from V position to X position under the influence of a return spring, and hence it should not be latched in the V position, and no latching notch 40 for the V position is provided.

In some other shutter constructions, however, it is permissible to latch the member 28 in the V position as well as in the X and M positions, without interfering with the proper action of the shutter when making delayed action or delayed beginning exposures. Wherever it is possible to do this, it is preferred to provide a latching notch 40 for the V position as well as for the X and M positions. Such a structure is shown at Fig. 4, which is otherwise the same as the construction shown in Fig. 3, except for the provision of the third notch 40.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter assembly comprising a housing, a lens having an optical axis, a shutter speed adjusting ring movable circumferentially on said housing about said optical axis as a center of rotation, a photoflash synchronizer adjusting member having a manually operable part projecting from said housing and movable circumferentially about said optical axis as a center, means mounted on a circumferentially immovable part of said shutter assembly and having positive locking engagement with said synchronizer adjusting member for locking said synchronizer adjusting member against circumferential movement to prevent accidental undesired movement thereof by accidental contact with a finger of an operator while moving said speed adjusting ring circumferentially, and manually operable release means responsive to manual pressure in a direction substantially different from circumferential movement for releasing said loching means from said locking engagement with said synchronizer adjusting member.

2. A photographic shutter assembly comprising a housing, a lens having an optical axis, a shutter speed adjusting ring movable circumferentially on said housing about said optical axis as a center of rotation, a photoflash synchronizer adjusting member having a manually operable part projecting from said housing and movable circumferentially about said optical axis as a center, means including a latching lever pivotally mounted on a circumferentially immovable part of said shutter assembly and having a positive locking engagement with said synchronizer adjusting member for locking said synchronizer adjusting member against circumferential movement to prevent accidental undesired movement thereof by accidental contact with a finger of an operator while moving said speed adjusting ring circumferentially, and a portion on said latching lever projecting outwardly from said housing to a manually accessible position and operable upon application of manual pressure in an approximately radial direction to release said latching lever from locking engagement with said synchronizer adjusting member so that the latter may be manually moved circumferentially.

3. A photographic shutter assembly comprising a housing, a lens having an optical axis, a shutter speed adjusting ring movable circumferentially on said housing about said optical axis as a center of rotation, a combined synchronizer and pre-timer adjusting member having a manually accessible part movable circumferentially with respect to said housing between a first synchronizer timing position, a second synchronizer timing position, and a third pre-timer position spaced circumferentially from each other, means mounted on a circumferentially immovable part of shutter assembly and having positive locking engagement with said synchronizer and pre-timer adjusting member for locking said synchronizer and pre-timer adjusting member against circumferential movement from at least said first and second positions, and manually operable release means including a movable part accessible externally of said housing and operated by movement in a direction substantially radially with respect to said optical axis for releasing said locking means so that said synchronizer and pre-timer adjusting member may be moved circumferentially away from a position in which it has been locked.

4. A construction as defined in claim 3, in which said locking means includes a locking member separate from and movable with respect to said synchronizer and pre-timer adjusting member, and in which said release means includes a finger piece spaced a substantial distance circumferentially from but not substantially diametrically opposite to said manually accessible part of said synchronizer and pre-timer adjusting member.

5. A construction as defined in claim 3, in which said locking means includes a locking member separate from and movable with respect to said synchronizer and pre-timer adjusting member, and in which said means for releasing said locking means includes a finger piece connected to said locking member and movable in a substantially radially inward direction to release said locking means so that said synchronizer and pre-timer adjusting member may be moved from a position in which it has been locked.

6. A construction as defined in claim 3, in which said locking means and releasing means include a plurality of notches formed on a portion of said synchronizer and pre-timer adjusting member which is enclosed within said housing, a latching lever lying mainly within said housing and extending in a generally circumferential direction within said housing, said latching lever being pivoted in said housing and having an end extending approximately radially outwardly through said housing to an accessible external position and having a portion for engaging in one or another of said notches when said synchronizer and pre-timer adjusting member is positioned to place a notch opposite said portion of said latching lever, and a spring within said housing engaging said latching lever and urging it in a direction to project said end radially outwardly and to seat said portion in one of said notches, radially inward manual pressure on said end of said latching lever serving to displace said portion from a notch in which it has been seated so that said synchronizer and pre-timer member may be moved circumferentially to a new position.

7. A construction as defined in claim 6, in which said notches in said synchronizer and pre-timer adjusting member and said portion of said latching lever have cooperating locking surfaces extending substantially radially with respect to the circumferential movements of said synchronizer and pre-timer adjusting member, so that circumferential pressure applied to said synchronizer and pre-timer adjusting member can not cause accidental displacement of said portion of said latching lever from a notch in which it is seated.

References Cited in the file of this patent

UNITED STATES PATENTS

| | | |
|---|---|---|
| 490,031 | Molera | Jan. 17, 1893 |
| 1,543,208 | Fairchild | June 23, 1925 |
| 2,222,298 | Nerwin | Nov. 19, 1940 |
| 2,404,526 | Pirwitz | July 23, 1946 |
| 2,439,087 | Harvey | Apr. 6, 1948 |
| 2,596,671 | Fuerst | May 13, 1952 |
| 2,655,085 | Gebele | Oct. 13, 1953 |
| 2,663,233 | Rentschler | Dec. 22, 1953 |
| 2,727,445 | Rentschler | Dec. 20, 1955 |